ELECTRICAL PULSE GENERATOR CHAIN CIRCUITS AND GATING CIRCUITS EMBODYING SUCH CHAIN CIRCUITS

Filed Feb. 11, 1954

INVENTOR
CHARLES MARK KRAMSKOY
BY Ralph E. Atherton
ATTORNEY 2,906,869

ELECTRICAL PULSE GENERATOR CHAIN CIRCUITS AND GATING CIRCUITS EMBODYING SUCH CHAIN CIRCUITS

Charles Mark Kramskoy, Ealing, London, England, assignor to Electric & Musical Industries Limited, Hayes, Middlesex, England, a British company Application February 11, 1954, Serial No. 409,621

Claims priority, application Great Britain February 19, 1953

2 Claims. (Cl. 250—27)

Figures 1, 2, 3, 4:
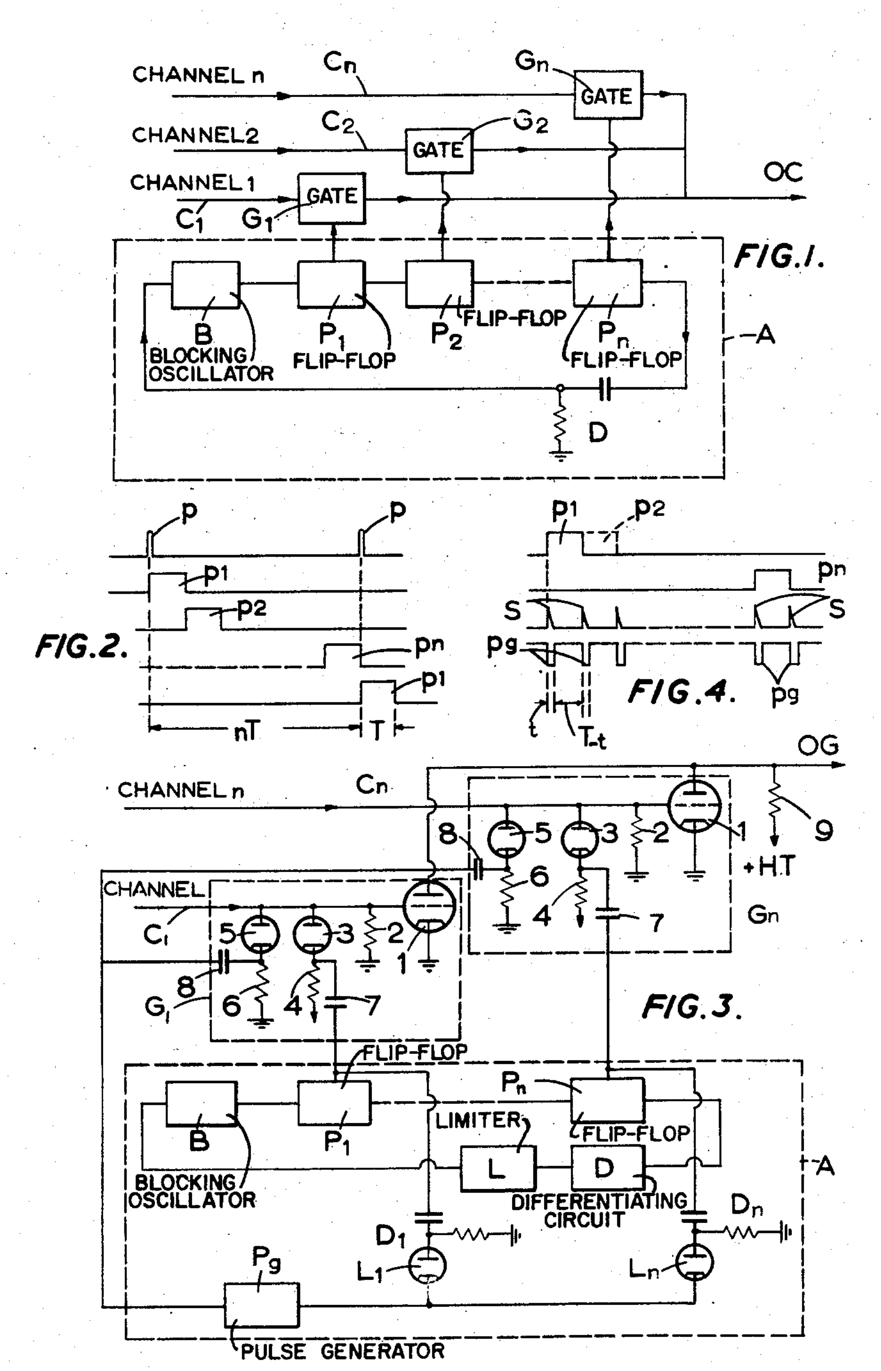

This invention relates to electrical pulse generator chain circuits and to gating circuits embodying such chain circuits.

In time-multiplex signalling systems and other circuits involving selection from a plurality of signal sources, it is often necessary to gate a plurality of signal channels in succession. The gating can conveniently be effected under the control of gating pulses generated by a chain circuit. For instance, to gate $n$ signal channels (where $n$ is an integer greater than 1) in repetitive succession $n$ similar switchable devices may be arranged in a ring chain, each device having one stable state and one unstable state. In such a chain each switchable device is arranged to be switched to the unstable state to initiate the generation of a gating pulse when the preceding device in the chain changes to the stable state and thereby terminates the generation of the preceding gating pulse in the sequence.

If the pulse generator chain circuit is required to gate the outputs of a plurality of channels in succession to a common load, then there may be a liability for spurious signals to appear across the common load due to the gates opening and closing at different rates, so that overlapping of the gating intervals occurs. The object of the present invention is to reduce this liability.

According to the present invention there is provided a gating circuit comprising a plurality of gates controlling different signal channels, a pulse generator chain circuit arranged to produce a sequence of pulses for opening said gates during successive time intervals, and including means for generating a further sequence of pulses timed by said first sequence of pulses and arranged to inhibit opening of said gates during guard periods between said time intervals.

In order that the invention may be clearly understood and readily carried into effect, the invention will be described with reference to the accompanying drawings.

Figure 1 illustrates diagrammatically and in block form one example of a pulse generator chain circuit in which the problem is solved by the present invention.

Figure 2 comprises waveform diagrams explanatory of the operation of Figure 1,

Figure 3 illustrates one example of the present invention applied to a circuit of the kind illustrated in Figure 1, and Figure 4 comprises waveform diagrams explanatory of the operation of Figure 3.

Referring to Figure 1 references $C_1$ to $C_n$ denote three of a series of $n$ separate signal channels associated with a common output channel OC by means of gates $G_1$ to $G_n$ whereby a selected one of the channels $C_1$ to $C_n$ can be connected to the output channel OC. A suitable form of construction for the gates $G_1$ to $G_n$ is illustrated in Figure 3, although other constructions may be adopted. The gates are controlled by means of a pulse generator chain circuit which is enclosed within the outline A, and comprises $n$ switchable devices $P_1$ to $P_n$ coupled in succession. Each of the devices $P_1$ to $P_n$ has one stable state and one unstable state, and may be in the form of a two valve flip-flop circuit with cathode coupling between the two valves such as described for example in Figure 35, page 59 of "Time Bases" by O. S. Puckle published in 1945 by Chapman and Hall. The coupling between the switchable devices is, moreover, such that when one device automatically reverts to its stable state from its unstable state it causes the succeeding device to change to its unstable state, so that the unstable state is transferred from one device to the next along the chain. Couplings of this kind are well known in the art and are provided, for example by coupling the anode of one valve of one flip-flop to the control electrode of the corresponding valve in the next flip-flop via a differentiating and a clipping circuit. The devices $P_1$ to $P_n$ are merely shown in block form since they may be of a variety of known constructions. The devices $P_1$ to $P_n$ are respectively coupled to the gates $G_1$ to $G_n$ in such manner that when a particular device changes to its unstable state and subsequently reverts to its stable state a positive pulse is applied to the respective gate and the gate is opened to connect the corresponding signal channel to the output channel OC for the duration of the pulse. It will be assumed that the devices $P_1$ to $P_n$ are all identical and the duration of each pulse is T seconds, as indicated in Figure 2, where the pulses $p_1$ to $p_n$ denote pulses generated by the respective devices $P_1$ to $P_n$. A negative pulse co-incident with the positive pulse $p_n$ is also derived from the device $P_n$, outputs of opposite polarities being usually obtainable respectively from the anodes of the two valves in a flip-flop circuit. The negative pulse is applied to a differentiating circuit D, comprising a capacitor and resistor as shown. The output of the differentiating circuit is fed, if desired via a cathode follower, to a blocking oscillator B which has its output coupled to the first switchable device $P_1$ in such manner that each time the blocking oscillator fires, a positive pulse $p$ (Figure 2) is fed to pulse generator $P_1$ to switch it to its unstable state, and the generation of a sequence of pulses by the chain is thereby initiated. For example, the output of the differentiating circuit D may be fed to the control electrode of the valve in the blocking oscillator, and the positive pulses $p$ may be derived from the cathode circuit of said valve. The differentiating circuit D and the blocking oscillator B thus comprise coupling between the device $P_n$ and the device $P_1$, completing the connection of the devices in a closed ring. The blocking oscillator is arranged to have a natural period T′ seconds such that T′ is greater than $n$T the sequence repetition period of the chain A. The period T′ is also such that, on completion of a sequence of pulses $p_1$ to $p_n$ initiated by the blocking oscillator B, the positive spike produced by differentiation of the trailing edge of the negative pulse co-incident with $p_n$ finds the blocking oscillator B in a sensitive condition so that it can be fired to terminate its blocking interval and produce another pulse $p$ to initiate a further sequence of pulses $p_1$ to $p_n$, the output of the differentiating circuit D being applied to the blocking oscillator B at a point where only the positive spikes can be effective to fire the blocking oscillator.

In operation of the arrangement, the pulse generator chain A generates repeated sequences of pulses $p_1$ to $p_n$ which open the gates $G_1$ to $G_n$ and connect the channels $C_1$ to $C_n$ in repetitive succession to the output channel OC, each gate being opened during each sequence repetition period for a time interval T. When starting up the circuit the blocking oscillator B initiates a first sequence of pulses $p_1$ to $p_n$ and thereafter each sequence of pulses is initiated in response to the termination of the preceding sequence, any sequence of pulses which may be running independently of the blocking oscillator, by reason of random switching of the devices $P_1$ to $P_n$ being quickly suppressed by the blocking oscillator. It will be understood that the blocking oscillator, being a relaxation device, has a time constant circuit which is charged to block the oscillator for a predetermined time after it has fired and the blocking oscillator can only be fired again after the charge in the time constant circuit has relaxed to a sufficient extent. Moreover the relaxation time is predetermined to ensure that two sequences of pulses cannot run independently round the ring. The inclusion of the blocking oscillator B in the pulse generator ring chain thus ensures that on switching on, the circuit will settle in a suitable stable operating condition. The durations of the individual pulses $p_1$ to $p_n$ is determined by time constant circuits in the switchable devices $P_1$ to $P_n$, so that the accuracy in the timing of the gating pulses is determined only by the devices $P_1$ to $P_n$, random variations in the blocking oscillator frequency such as might normally be encountered having no effect since the blocking oscillator is positively fired by feedback from the device $P_n$.

In the example of the invention illustrated in Figure 3, two of the gates $G_1$ to $G_n$ are illustrated and it will be assumed that all the other gates are of the same construction. Thus, each of the gates comprises a thermionic amplifying valve 1 having its control electrode fed from the appropriate signal channel, for example channel 1 in the case of the gate $G_1$. In each gate the control electrode of the valve 1 is grounded by a resistor 2 and this resistor is shunted by two paths, one of which includes a diode 3 and a resistor 4, and the other of which includes a diode 5 and a resistor 6. The resistors 2 and 6 are shown directly grounded but either of them may be returned to ground through a negative bias source for establishing the working bias for the valve 1 and for minimising the pedestal produced when the valve is switched on. The cathode of diode 3 is normally biassed via the resistor 4 to such a negative potential that the diode is maintained conducting and biasses the control electrode of the valve 1 to such an extent that this valve is maintained non-conducting. The positive gating pulses generated by each of the devices $P_1$ to $P_n$ are fed via a capacitor 7 to the cathode of the diode 3 in the respective gate, and the pulses $p_1$ to $p_n$ are in addition fed to differentiating circuits $D_1$ to $D_n$ which serve to produce positive and negative spikes on the occurrence of the leading and trailing edges respectively of the corresponding pulses $p_1$ to $p_n$. The outputs of the differentiating circuits are then fed via clipping diodes $L_1$ to $L_n$ to a pulse generator $P_g$, the diodes $L_1$ to $L_n$ serving to prevent undesired coupling between the devices $P_1$ to $P_n$ and also to remove the negative spikes so that only positive spikes are fed to the generator. It will thus be appreciated that the input to the pulse generator $P_g$ consists of a sequence of spikes S (Figure 4) corresponding to the leading edges of the pulses $p_1$ to $p_n$, and the pulse generator $P_g$ is arranged to produce in response to each spike S a negative pulse $p_g$ whose duration $t$ is a small fraction of the duration T of the gating pulses $p_1$ to $p_n$. The pulses $p_g$ generated by the device $P_g$ are fed in parallel via capacitors 8 to the cathode of the diode 5 in each of the gates $G_1$ to $G_n$. The valves 1 in the gates $G_1$ to $G_n$ have a common anode load resistor 9 and the output of the gating circuit is derived from this load resistor.

In operation of the arrangement shown in Figure 3, when a positive pulse is generated by any of the devices $P_1$ to $P_n$ and applied to the cathode of the diode valve 3 in the associated gate, the diode 3 is rendered non-conducting and the bias potential applied to the corresponding valve 1 tends to rise to such a level that the valve can conduct and transmit signals from the corresponding channel to the output load resistor 9. However, during the first part of each interval T, the opening of the appropriate gate is inhibited by the corresponding pulse $p_g$ which acts as a guard pulse. Thus, the pulse $p_g$ switches on each of the diode valves 5 for the time $t$ and during that time maintains sufficient negative bias on the control electrodes of the valves 1 to hold all the valves 1 nonconducting, so that all the gates are closed. The gates can therefore only be opened during the intervals $T-t$ indicated in Figure 4 of the drawing and the guard periods $t$ are arranged to be such as to remove any liability for overlapping of the intervals when the gates are open. In the absence of the guard periods, overlapping would be liable to arise, for example, as a result of the opening of the gates being more rapid than the closing of the gates. The pulse generator $P_g$ may be a flip-flop, or a free-running multivibrator whose natural period is slightly greater than T. The guard periods may alternatively be caused to occur at the end of each gating period T by arranging that the pulse generator $P_g$ produces positive pulses whose leading edges are synchronous with the spikes S and whose duration is equal to $T-t$ seconds.

It will be appreciated that in Figure 3, guard pulses are produced for $n$ gates using only a single pulse generator so that considerable economy of components is achieved. Moreover the diodes 5 can be dispensed with by using pentodes for the valves 1 and applying the guard pulses to the suppressor electrodes.

What I claim is:

1. A gating circuit comprising a plurality of gates controlling different signal channels, a pulse generator chain circuit for producing a sequence of pulses with the leading edge of each pulse initiated by the trailing edge of the preceding pulse, connections for feeding pulses from said chain circuit to said gates tending to open said gates in predetermined sequence, means for generating a further sequence of pulses with each pulse of the further sequence overlapping an edge part of a pulse of the first mentioned sequence and being of shorter duration than said pulse of the first mentioned sequence, and means responsive to said further sequence of pulses for inhibiting the opening of said gates to provide a guard period between the closing of one gate and the opening of the succeeding gate.

2. A gating circuit comprising a plurality of gates controlling different signal channels, a pulse generator chain circuit for producing a sequence of pulses with the leading edge of each pulse initiated by the trailing edge of the preceding pulse, connections for feeding pulses from said chain circuit to said gates tending to open said gates in predetermined sequence, a pulse generator responsive to said first sequence of pulses for generating the second sequence of pulses with each pulse of the second sequence overlapping an edge part of a pulse of the first mentioned sequence and being of shorter duration than said pulse of the first mentioned sequence, and means for feeding pulses from the latter pulse generator to said gates to inhibit opening of said gates and provide a guard period between the closing of one gate and the opening of the succeeding gate.

References Cited in the file of this patent

UNITED STATES PATENTS

| | | |
|---|---|---|
| 2,402,916 | Schroeder | June 25, 1946 |
| 2,462,111 | Levy | Feb. 22, 1949 |
| 2,486,491 | Meacham | Nov. 1, 1949 |
| 2,559,499 | Gillette et al. | July 3, 1951 |
| 2,586,409 | White | Feb. 19, 1952 |
| 2,616,977 | Staal | Nov. 4, 1952 |
| 2,658,142 | John | Nov. 3, 1953 |
| 2,662,175 | Staal | Dec. 8, 1953 |